US006185535B1

(12) United States Patent
Hedin et al.

(10) Patent No.: US 6,185,535 B1
(45) Date of Patent: Feb. 6, 2001

(54) VOICE CONTROL OF A USER INTERFACE TO SERVICE APPLICATIONS

(75) Inventors: Jan Hedin, Tumba; Bernhard Meier, Kista, both of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/173,748

(22) Filed: Oct. 16, 1998

(51) Int. Cl.[7] .............................. G10L 15/00; G10L 15/22
(52) U.S. Cl. ............................................ 704/270; 704/275
(58) Field of Search ................................. 704/251, 270, 704/275; 379/88.01, 88.04

(56) References Cited

U.S. PATENT DOCUMENTS

| | | |
|---|---|---|
| 5,797,116 | 8/1998 | Yamada et al. . |
| 5,799,063 * | 8/1998 | Krane ................................. 379/88.17 |
| 5,884,266 * | 3/1999 | Dvorak ................................. 704/275 |
| 5,890,123 * | 3/1999 | Brown et al. ........................ 704/275 |
| 5,915,001 * | 6/1999 | Uppaluru ........................... 379/88.22 |
| 5,924,070 * | 7/1999 | Ittycheriah et al. ................. 704/275 |
| 5,926,789 * | 7/1999 | Barbara et al. ...................... 704/275 |
| 5,956,683 * | 9/1999 | Jacobs et al. ........................ 704/275 |
| 5,960,399 * | 9/1999 | Barclay et al. ....................... 704/270 |
| 5,983,184 * | 11/1999 | Noguchi .............................. 704/270 |
| 5,991,723 * | 11/1999 | Duffin ................................. 704/260 |
| 6,029,135 * | 2/2000 | Krasle ................................ 704/275 |
| 6,078,886 * | 6/2000 | Dragosh et al. ..................... 704/270 |
| 6,094,476 * | 7/2000 | Hunt et al. ........................ 379/88.04 |

FOREIGN PATENT DOCUMENTS

| | | |
|---|---|---|
| 2323693A | 9/1998 | (GB) . |
| WO95/17746 | 6/1995 | (WO) . |
| WO98/34217 | 8/1998 | (WO) . |

OTHER PUBLICATIONS

Michele Borgatti, et al., "A Low–Power Integrated Circuit for Remote Speech Recognition," IEEE Journal of Solid–State Circuits, vol. 33, No. 7, Jul. 1998, pp. 1082–1089.
"Industry Support for Wireless Application Protocol Gains Momentum", Press Release Jul. 7, 1997.
"Architecture for Wireless Application Protocol Published on the World Wide Web", Press Release Sep. 15, 1997.

* cited by examiner

*Primary Examiner*—David R. Hudspeth
*Assistant Examiner*—Martin Lerner
(74) *Attorney, Agent, or Firm*—Burns, Doane, Swecker & Mathis, L.L.P.

(57) ABSTRACT

Voice control of a service application provided to a terminal from a remote server is distributed between the terminal and a remote application part. A relatively low power automatic speech recognition system (ASR) is provided in the terminal for recognizing those portions of user-supplied audio input that relate to terminal functions or functions defined by a predefined markup language. Recognized words may be used to control the terminal functions, or may alternatively be converted to text and forwarded to the remote server. Unrecognized portions of the audio input may be encoded and forwarded to the remote application part which includes a more powerful ASR. The remote application part may use its ASR to recognize words defined by the application. Recognized words may be converted to text and supplied as input to the remote server. In the reverse direction, text received by the remote application part from the remote server may be converted to an encoded audio output signal, and forwarded to the terminal, which can then generate a signal to be supplied to a loudspeaker. In this way, a voice control mechanism is used in place of the remote server's visual display output and keyboard input.

34 Claims, 5 Drawing Sheets

VOICE CONTROL OF A USER INTERFACE TO SERVICE APPLICATIONS

BACKGROUND

The present invention relates generally to control of service applications, more particularly to voice control of service applications, and still more particularly to voice control of service applications from a remote terminal.

The most common type of terminal for Internet access is a conventional personal computer (PC) terminal with a large, high resolution display and a relatively high data transmission bandwidth. When a user wishes to use an Internet connection to control a service application located at a remote location, he or she typically uses the keyboard associated with the PC terminal, and types in commands. The data is communicated via the Internet to the service application, which can then respond accordingly. The user's PC terminal display permits response information to be displayed in the form of text and/or graphics which can easily be viewed by the user.

The recent standardization of a Wireless Application Protocol (WAP), using the Wireless Markup Language (WML), has enabled terminals with small displays, limited processing power and a low data transmission bandwidth (e.g., digital cellular phones and terminals) to access and control services and content in a service network such as the Internet. WAP is a layered communication protocol that includes network layers (e.g., transport and session layers) as well as an application environment including a microbrowser, scripting, telephony value-added services and content formats. The simple syntax and limited vocabulary in WML makes WAP suitable for controlling the service and for interacting with the content from a client terminal with low processing and display capabilities.

While the ability to use these smaller terminals is a major convenience to the user (who can more readily carry these along on various journeys), reading selection menus and other large amounts of text (e.g., e-mail and help text) from a small display and typing in responses on a small keyboard with multi-function keys has some disadvantages. These disadvantages may be largely overcome by the substitution of a voice-controlled interface to the service application. A voice-controlled interface is also useful for providing "hands-free" operation of a service application, such as would be required when the user is driving a car.

Automatic speech recognition systems (ASR) are known. An ASR for supporting a voice-controlled application may be a user shared resource in a central server or a resource in the client terminal. The simpler ASR recognizes isolated words with a pause in-between words, whereas the advanced ASR is capable of recognizing connected words. The complexity of the ASR increases with the size of the vocabulary that has to be recognized in any particular instance of the dialog with the application.

If the ASR is implemented at a central server, it must be capable of recognizing many users with different languages, dialects and accents. Conventional speaker-independent speech recognition systems normally use single word ASR with a very limited vocabulary (e.g., "yes", "no", "one", "two", etc.) to reduce the amount of required processing and to keep the failure rate low. Another alternative for improving the accuracy of recognition is to make the speech recognition adaptive to the user by training the recognizer on each user's individual voice, and asking the user to repeat or spell a misunderstood word. In a multi-user environment, each user's profile must be stored.

An implementation of the speech recognizer in the terminal will only have to recognize one user (or a very small number of users) so adaptive training may be used. The required processing for a combined word ASR may still be too large to be implemented in the terminal. For example, the processing power of today's mobile terminals (such as those employed in cellular telephone systems, personal digital assistants, and special purpose wireless terminals) is sufficient for implementing an isolated word ASR with a small vocabulary (e.g., for dialing and for accessing a personal telephone book stored in the terminal). Training may be required for adding new words to the vocabulary.

A problem that exists in present day centralized server ASRs is that a voice channel (voice call) has to be established between the terminal and a gateway or server that performs voice recognition. However, a voice channel may introduce distortion, echoes and noise that will degrade the recognition performance.

A centralized ASR is also an expensive and limited network resource that will require a high processing capability, a large database and an adaptive training capability for the individual voices and dialects in order to bring down the failure rate in the recognition process. Because it is a limited resource, the central server or gateway may need to implement a dial up voice channel access capability.

The new generation of WAP-supported mobile terminals will be able to control and interact with a large variety of services and content. However, the terminal display and keyboard typically have very limited input/output (I/O) capability, thereby making a voice-controlled interface desirable. As explained above, today's low-cost terminals can support some ASR capability, but this is inadequate to support voice access to a multi-user Application Server that will require a large vocabulary or a time-consuming training of the recognizer for each application.

SUMMARY

It is therefore an object of the present invention to provide methods and apparatuses for enabling relatively low power terminals to access and control remote server applications via a voice controlled interface.

The foregoing and other objects are achieved in methods and apparatuses for controlling a service application provided to a terminal from a remote server. In accordance with one aspect of the invention, this is achieved by receiving an audio input signal representing audio information, and using a first automatic speech recognition system located in the terminal to determine whether the audio input signal includes one or more words defined by a first vocabulary, wherein portions of the audio input signal not corresponding to the one or more words defined by the first vocabulary constitute an unrecognized portion of the audio input signal. If the audio input signal includes one or more words defined by the first vocabulary, then a terminal application part of an application protocol service logic is used to determine what to do with the one or more words defined by the first vocabulary. The unrecognized portion of the audio input signal is formatted for inclusion in a data unit whose structure is defined by a first predefined markup language. The data unit is communicated to a remote application part via a first digital data link that operates in accordance with a first application protocol. In the remote application part, the formatted unrecognized portion of the audio input signal is extracted from the data unit. A remote application part service logic is then used to determine what to do with the formatted unrecognized portion of the audio input signal.

In another aspect of the invention, the audio input signal is in the form of compressed digitally encoded speech.

In yet another aspect of the invention, if the audio input signal includes one or more words defined by the first vocabulary, then the terminal application part of the application protocol service logic causes the one or more words to be used to select one or more terminal functions to be performed.

In still another aspect of the invention, the one or more terminal functions include selecting a current menu item as a response to be supplied to the remote server.

In yet another aspect of the invention, a current menu item is associated with a first selection; and the one or more terminal functions include associating the current menu item with a second selection that is not the same as the first selection.

In still another aspect of the invention, if the audio input signal includes one or more words defined by the first vocabulary, then the terminal application part of the application protocol service logic causes a corresponding message to be generated and communicated to the remote application part via the first digital data link. In some embodiments, the corresponding message may include state information, text or binary data.

In yet another aspect of the invention, the remote application part forwards the corresponding message to the remote server.

In still another aspect of the invention, the remote application part forwards the corresponding message to the remote server via a second digital data link that operates in accordance with a second application protocol. The first application protocol may, but need not be the same as the second application protocol.

In yet another aspect of the invention, a second automatic speech recognition system located in the remote application part is used to determine whether the unrecognized portion of the audio input signal includes one or more words defined by a second vocabulary. If the unrecognized portion of the audio input signal includes one or more words defined by the second vocabulary, then the remote application part service logic is used to determine what to do with the one or more words defined by the second vocabulary.

In still another aspect of the invention, the first vocabulary exclusively includes words defined by a syntax of the first predefined markup language; and the second vocabulary exclusively includes words associated with the remote server.

In yet another aspect of the invention, if the unrecognized portion of the audio input signal includes one or more words defined by the second vocabulary, then the remote application part service logic causes a corresponding keyboard emulation response to be generated and sent to the remote server.

In another aspect of the invention, if the unrecognized portion of the audio input signal includes one or more words defined by the second vocabulary, then the remote application part service logic causes a remote application part service logic state to be changed.

In still another aspect of the invention, the remote application part receives text from the remote server, and generates a corresponding audio output signal representing audio information. The audio output signal is formatted for inclusion in a second data unit whose structure is defined by the first predefined markup language. The second data unit is communicated to the terminal via the first digital data link.

In the terminal, the audio output signal is extracted from the second data unit and a loudspeaker signal is generated therefrom.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters. The following description utilizes the WAP and WML standards as a basis for linking a relatively low-power terminal to a remote application. However, it will be recognized that these standards are used by way of example only, and that the inventive concepts utilized here are equally applicable in other environments that do not operate in accordance with these particular standards.

Figure 1A:
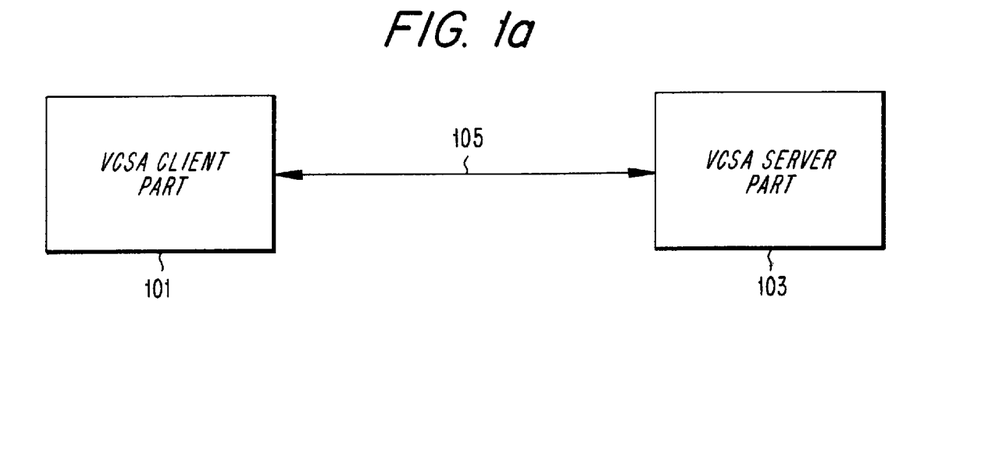
FIGS. 1a and 1b are block diagrams of alternative embodiments of a distributed VCSA in accordance with one aspect of the invention.
Figure 1B:
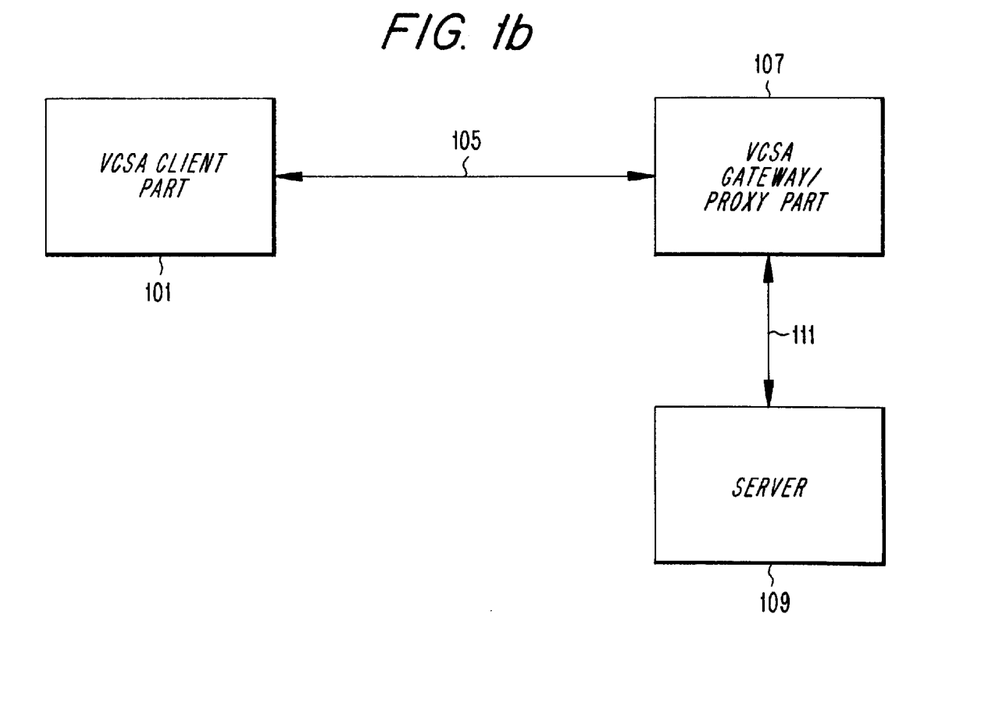

In one aspect of the invention, components of a Voice Controlled Service Application (VCSA) are distributed between parts implemented in the terminal, and remaining parts that are implemented in remote equipment. FIGS. 1a and 1b are block diagrams of alternative embodiments of a distributed VCSA in accordance with this aspect of the invention. In FIG. 1a, a client part 101 is coupled to a server part 103 via a first digital link 105. The client part 101 is implemented in the terminal, while the server part 103 is implemented in a separate processor that is most likely at a remote location. The processor in which the server part 103 runs is, in most embodiments, more powerful (e.g., faster, more storage space, etc.) than the terminal in which the client part 101 runs. The first digital link 105 for coupling the client and server parts 101, 103 may be wireless or wireline. The data that is communicated over the first digital link 105 is preferably in the form of cards and scripts/libraries created by a standardized markup language, such as WML. In alternative embodiments, different markup languages can be used instead. In each case, however, the markup language should be one that is supportable by the terminal's relatively low processing power and limited input/output resources. The WML is preferred for use in wireless mobile terminals because its cards and scripts/libraries, which can be downloaded through WAP URL services, can be used to create applications that enhance and extend services available in today's advanced mobile networks.

The client part 101 includes a simple ASR, such as one that is capable of recognizing a small number (e.g., up to about 50) isolated words. A more powerful ASR, such as one capable of recognizing a large vocabulary of words supplied in continuous speech, is implemented in the server part 103. In operation, the client part 101 receives speech from the user. The ASR in the client part 101 attempts to isolate and recognize words. Those that are correctly recognized are acted upon. Many of the recognized words typically would be used to control local functions in the terminal, such as scrolling through a menu, selecting a menu item, and accessing various terminal resources such as a locally stored phone book. Other words may be recognized as operands (e.g., data) that should be supplied to the server. For these words, corresponding text is retrieved from a memory in the terminal. This text is then sent to the server part 103 via the first digital link 105. The text is formatted in such a way that the server part 103 will recognize it as data input, and will treat it accordingly.

Those words that are not recognized by the client part 101 are formatted (e.g., as Multipurpose Internet Mail Extension (MIME) types) and sent to the server part 103. The server part 103 ascertains that this is unrecognized speech, and uses its own, more powerful ASR to analyze the received speech. After the analysis, the server part 103 may act accordingly. For example, the recognized speech may consist of commands for controlling the server application, in which case the commands are acted upon. The recognized speech may also represent data input for the server application, in which case it is treated as such. In the event that the ASR is unable to recognize the supplied speech, it may take actions such as sending encoded speech back to the client part 101, which in turn plays the encoded speech to the user. The encoded speech in this case may be a voiced request for the user to repeat or spell out the unrecognized speech.

In the alternative embodiment depicted in FIG. 1b, the server part 103 has been replaced by a gateway/proxy part 107 that is coupled to a server 109 by means of a second digital link 111. The second digital link 111 for coupling the gateway/proxy part 107 and the server 109 may be wireless or wireline. The data that is communicated over the second digital link 111 is preferably in the form of cards and scripts/libraries created by a standardized markup language that may, but need not be, the same as the data format that is used on the first digital link 105. When the data formats are different, one function of the gateway/proxy part 107 is to convert the data from one format to the other. Conversion in this case may include not only substituting keywords from one format to another (e.g., from Hyper-Text Markup Language (HTML) to WML), but also some level of filtering to weed out data that cannot be received by the terminal. For example, if the server 109 is an application that is accessible via the Internet, then it may send HTML web pages that include graphical information that cannot be displayed on the relatively low power terminal. In this case, the gateway/proxy part 107 needs to eliminate such data, and pass on to the client 101 only that data that is appropriate.

In many embodiments, it is anticipated that the data formats used on the first and second data links 105, 111 will be the same, such as both being WML formats. In such cases, the conversion performed by the gateway/proxy part 107 may likely include the substitution of voice data for text, and vice versa. That is, the server 109 may provide data in the form of large text menus that are intended to be displayed on a PC screen. However, as explained above, the relatively low power terminal may not be capable of displaying large menus, and/or such large menus may be difficult for the user to read on a small terminal screen. Thus, in one aspect of the invention, the gateway/proxy part 107 converts the received text into audio that may be supplied to the client part 101 (as MIME formatted data) and played for the user. In this way, the user can hear the possible selections, rather than having to view them on the screen. The user may make selections by speaking them, rather than typing them. As explained above, the spoken text will either be recognized and converted to text by the ASR in the client part 101, or alternatively by the ASR in the gateway/proxy part 107. In either case, this text is then passed by the gateway/proxy part 107 to the server 109. In this way, the server 109 need not be specially configured to deal with a vocal interface. In fact, in this configuration the existence of the vocal interface is completely transparent to the server 109, which is aware only of the text that it sends and receives.

The invention will now be described in greater detail with reference to an exemplary embodiment depicted in FIGS. 2 and 3. The architecture of this exemplary embodiment is essentially the same as that depicted in FIGS. 1a and 1b. However, in this embodiment the total system is logically divided into four parts: a Terminal Part (TP) 203; a Terminal Application Part (TAP) 201; a Remote Application Part (RAP) 205; and an External Services and Content (ESC) 207 part. The TP 203 and TAP 201 embody the client part 101 of the VCSA, and the RAP 205 embodies either the server part 103 or the gateway/proxy part 107 of the VCSA. The ESC 207 corresponds to the server 109. These components will now be described in greater detail. It will be understood that the various components described below are individually either well-known (e.g., various storage elements, microphone, loudspeaker), or easily implementable based on the high-level description provided, and therefore need not be described at a high level of detail. Various embodiments may utilize one or more programmable elements executing a stored program to perform a number of functions (e.g., audio feature matching, maintenance of protocol stacks, etc.). In alternative embodiments, these may instead be hardwired logic gates. Whether a particular implementation approach is better than another will depend on the particular application being considered, and is therefore beyond the scope of this disclosure.

The TP 203 is implemented in the terminal, and supports the WAP standard (or alternatively another application protocol). A TAP interface 209 is provided for allowing interaction with the TAP 201, which supports voice interaction and control of a WAP application. The TP 203 further includes a WAP client protocol stack 213 for enabling communication in accordance with the WAP standard protocol via a first data link 211, which may alternatively be wireless or wireline digital channel.

A microphone 215 is provided in the TP 203 for receiving speech from a user of the terminal. The output of the microphone 215 is supplied to a TP audio encoder (e.g., a GSM voice encoder) which encodes the audio input signal into a compressed data format. The encoded audio data is supplied to the TAP interface 209. When audio is to be presented to the user, it is supplied, through the TAP interface 209, in the compressed data format (e.g., the GSM voice encoder format) to a TP audio decoder 219, the audio output of which is supplied to a speaker 221.

The TAP 201 is also implemented in the terminal for the purpose of supporting the basic voice interaction with the terminal functions, such as call handling, address book management, and the like. The TAP 201 also supports the voice interaction and control of the WAP application. The TAP 201 includes a TP interface 223 that enables it to communicate with the TP 203.

The TAP 201 functions as a voice-oriented browser in the terminal. The functioning of this browser will now be described with reference to the flowchart of FIG. 4. Audio input is received from the microphone 215 and supplied to the TP audio encoder 217 (step 401). The output from the TP audio encoder 217 is supplied, through the TAP interface 209 and the TP interface 223, to a start/stop detector and recording unit 225 implemented in the TAP 201 (step 403). The TAP 201 uses the start/stop detector and recording unit 225 to detect the start and stop of a supplied voice input signal, and to use this to limit the extension of the audio input to an audio time interval referred to herein as an "isolated word". The start/stop detector and recording unit 225 includes a cache memory (not shown) for storing (i.e., recording) the TP audio encoded data for this isolated word.

Figure 4:
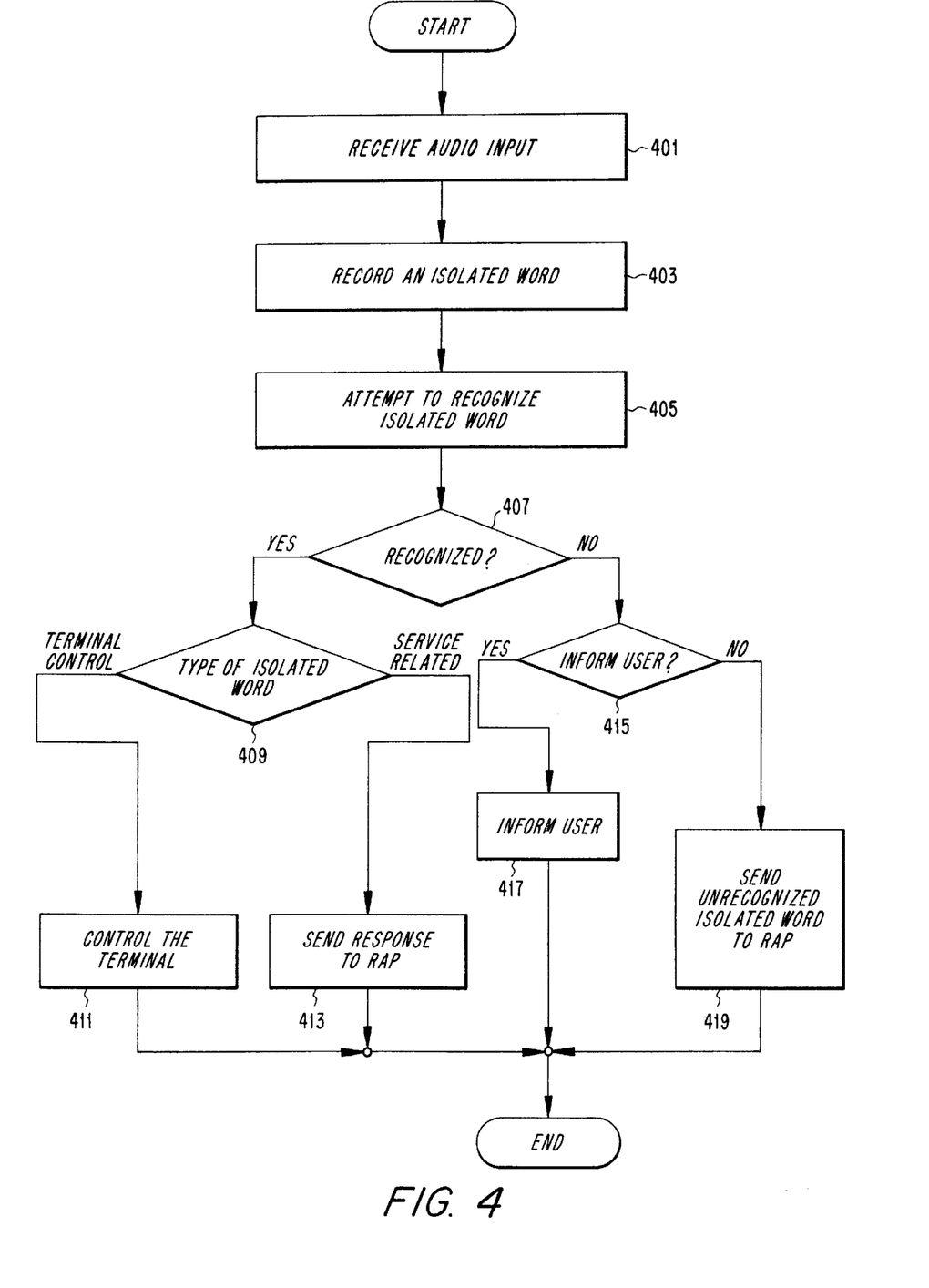
FIG. 4 is a flowchart of operations performed by the terminal application part in accordance with an exemplary embodiment of the invention.

The isolated word is supplied from the start/stop detector and recording unit 225 to an ASR unit 227 for isolated word recognition analysis (step 405). The ASR 227 in this exemplary embodiment includes a feature vector extraction unit 229 which receives the isolated word and maps it into a vector space that is suitable for use by a feature matching and decision unit 231. A reference vocabulary, including the limited standard WAP vocabulary in the WML syntax and a predefined vocabulary that is terminal dependent, is stored in a TAP reference data base 233. The predefined, terminal-dependent vocabulary is used for extending the WML standard vocabulary to include words that will make the application dialog more user friendly or to control terminal functions that are not in the VCSA. The isolated words are preferably stored in three formats: the text format, the corresponding TP audio encoded data, and the associated feature vector representing the isolated word. Feature vectors from the TAP reference data base 233 are supplied to a second input of the feature matching and decision unit 231. The feature matching and decision unit 231 compares the feature vector supplied at the output of the feature vector extraction unit 229 with feature vectors supplied by the TAP reference data base 233, and determines whether a match is found. Outputs 237, 239 from the feature matching and decision unit 231 are supplied to the TAP control logic 235 and indicate whether a match was found (decision block 407).

Isolated words may be of several types: those which are associated with terminal control functions (e.g., scrolling a menu up or down); those that determine a response that is to be forwarded to the RAP 205 (and perhaps ultimately to the server), such as a "SELECT" command for selecting one item from a menu (equivalent to "clicking" on a menu item using a PC mouse); and those that are entirely defined by the particular server application. Thus, if an isolated word is recognized in the terminal ("Yes" output from decision block 407), a determination is then made to determine what type of isolated word it is (decision block 409). When a terminal control word is recognized, the TAP control logic 235 causes the terminal function to be performed (step 411). In some cases, this may include generating audio output to indicate to the user a change in a current terminal state, such as which item in a menu is currently being selected.

If the recognized word is service related, an appropriate response is generated as a message and transferred to the RAP (step 413), via the WAP client protocol stack 213. The message might include any combination of state information, text, binary data and other information necessary to allow the RAP 205 to generate an appropriate response that is to be forwarded to the ESC 207. The response generated by the RAP 205 will preferably emulate a keyboard input selection that would be generated by a normal text-based WAP terminal. Although this keyboard response could be generated by the TAP 201 and merely passed to the RAP 205 for forwarding to the ESC 207, it is preferred, for efficiency reasons, to merely send the necessary state (and/or other) information to the RAP 205 and to allow it to generate its response to the ESC 207 in the form of the necessary keyboard emulation response, including but not limited to text, binary data, state information or menu selection code(s).

Returning now to decision block 407, if the isolated word was not recognized by the ASR 227, the TAP control logic 235 in conjunction with the TAP WAP service logic 245 makes a decision whether to inform the user (decision block 415). This decision may be based, for example, on a current terminal state and a state machine being used by the TAP control logic 235. For example, if the TAP control logic 235 is expecting a terminal control or menu selection function to be received, then the user might be informed (step 417) that the isolated word was not recognized, and be asked to repeat the isolated word or to enter the input by spelling it or even by means of a keyboard selection. Alternatively, if the TAP control logic 235, in conjunction with TAP WAP service logic 245, is expecting unrecognizable audio input to be provided, such as for use as content for Email that is being generated, then the unrecognized isolated word might simply be passed on to the RAP 205 (step 419). Since the RAP's ASR 307 is preferably more powerful than the TAP's ASR 227, the unrecognized isolated word might also be passed on to the RAP 205 if the TAP 203 wants assistance with the task of recognizing the unrecognized isolated word. This aspect of the invention is described in greater detail below.

In order to pass the unrecognized isolated word on to the RAP 205, the audio encoded data from the start/stop detector and recording unit 225 is formatted as MIME types by a MIME formatting unit 247. Communication of the MIME-formatted audio encoded data is made through the TP interface 223, the TAP interface 209, and the WAP client protocol stack to a communication RAP interface 243 that is coupled to the first data link 211. The TAP 201 is a client to RAP service logic 321 located in the RAP 205, and may be implemented in a small WAP terminal device with low processing capacity (including mobile as well as stationary devices). The RAP service logic 321 may also be a client to the services and content in the ESC 207.

As mentioned above, voice output to the user is generated by the TP audio decoder 219 having an output coupled to a speaker 221. The TP audio decoder 219 accepts data in the TP audio encoded format from the TAP reference database 233 or from the RAP 205. TP audio encoded format data supplied by the RAP 205 may be received imbedded as MIME types in the WAP protocol. This technique has the advantage of eliminating the need for any text-to-speech conversion module in the terminal. Additional words, stored as TP audio encoded data in the TAP reference database 233, may be used to supplement the dialog in order to make it more user friendly.

Turning now to the RAP server 205 (and to FIG. 3, which depicts the RAP 205 in greater detail), it may be implemented as a multi-user, central WAP application server, as a WAP gateway/proxy or as a single-user local server, dedicated to the TAP user (e.g., the user's PC, palmtop device, and the like). It is anticipated that the RAP 205 will usually have a more powerful processing capacity for automatic speech recognition as well as a RAP reference database for the extended vocabulary that is required for the particular service application.

Figure 2:
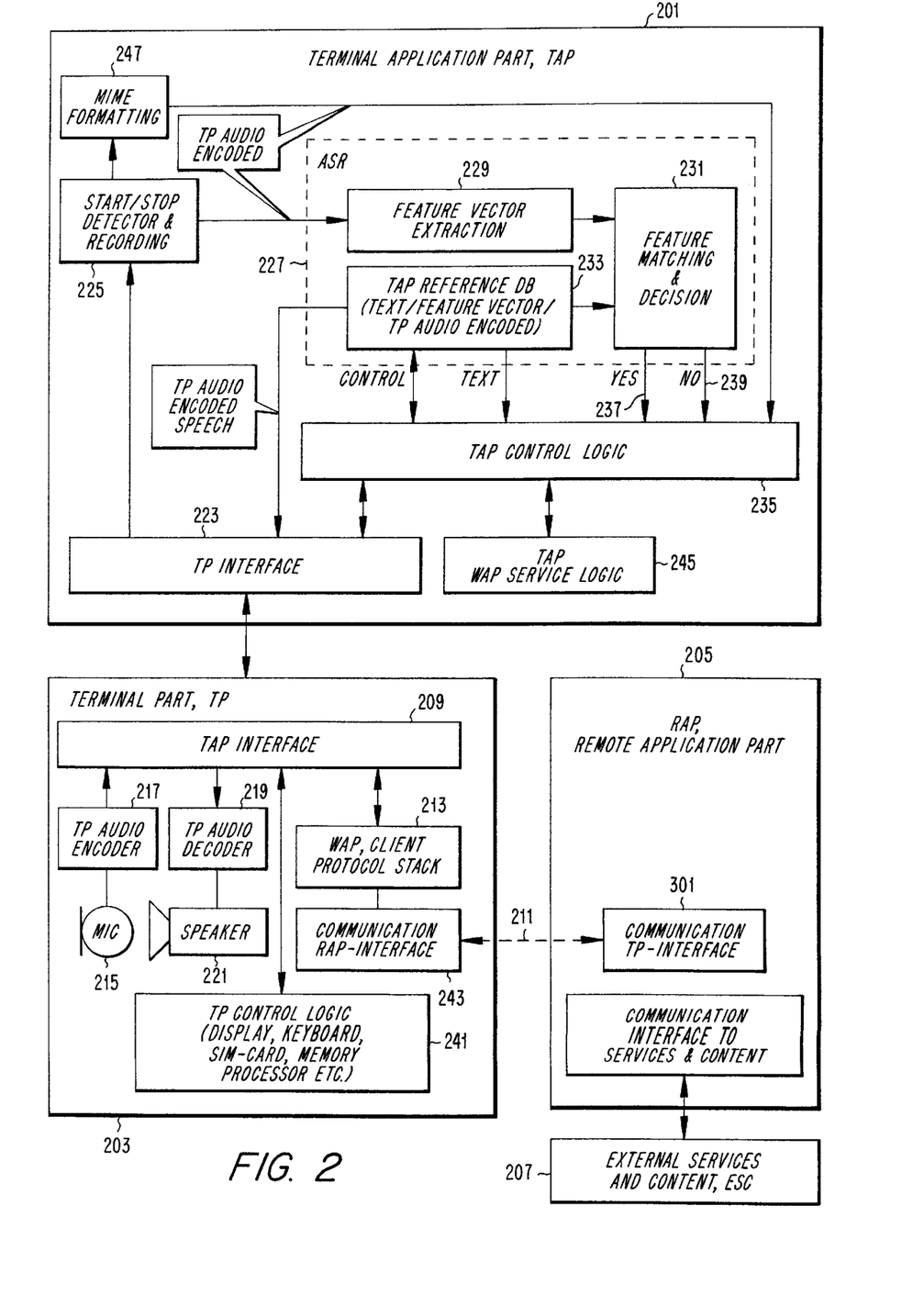
FIG. 2 is a block diagram of an exemplary embodiment of a voice controlled remote server in accordance with the invention.
Figure 3:
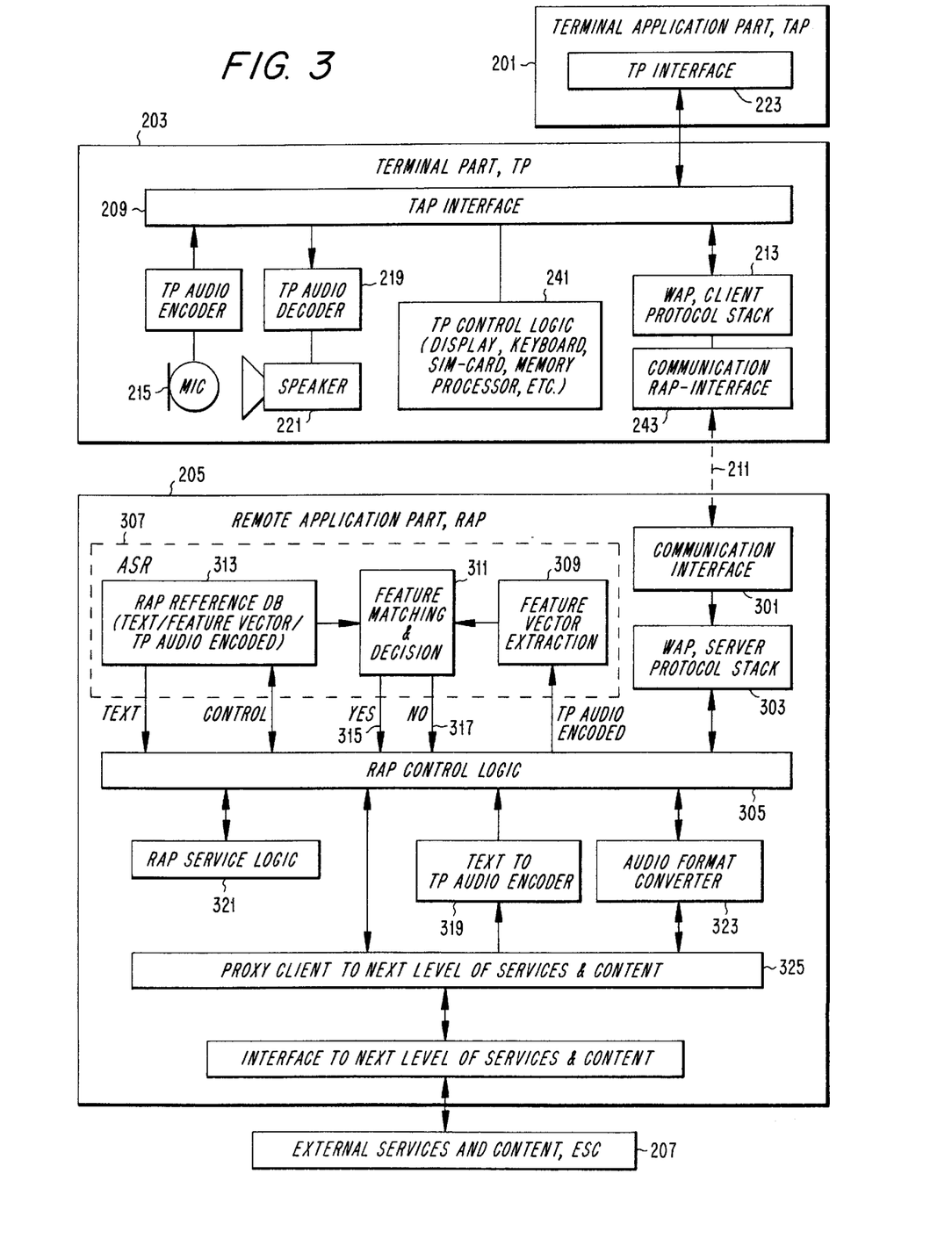
FIG. 3 is a block diagram of an exemplary embodiment of a voice controlled remote server in accordance with the invention.

As shown in FIGS. 2 and 3, the RAP 205 may also be implemented as a WAP gateway/proxy, connected to an ESC 207 in a different location. For example, the ESC 207 may be one or more application servers that provide information and content over the Internet.

As indicated earlier, the RAP 205 is coupled to the first data link 211, and therefore has a first communication interface 301 coupled to the first data 211 for this purpose. The first communication interface 301 is also coupled to a WAP server protocol stack 303, which ensures that communications proceed in accordance with the WAP (or alternatively other chosen) communication protocol. The RAP 205 also includes RAP control logic 305 for controlling the operation of other RAP resources. Among these is an ASR 307 that will recognize the TP audio encoded words that were not recognized in the TAP 201, that is, words that were transferred to the RAP 205 as MIME types in the WAP protocol. To perform speech recognition, the RAP's exemplary ASR 309 includes a feature vector extraction unit 309, a feature matching and decision unit 311 and a RAP reference database 313. In operation, TP audio encoded data is supplied to the feature vector extraction unit. The corresponding feature vector is then supplied to the feature matching and decision unit 311. The RAP reference database 313 stores the feature vectors, corresponding text and corresponding TP audio encoded data of all words to be recognized. Feature vectors from the RAP reference database 313 are supplied to another input of the feature matching and decision unit 311. The feature matching and decision unit 311 compares the feature vector supplied by the feature vector extraction unit 309 with feature vectors supplied by the RAP reference database 313, and indicates on output lines 315, 317 whether the input word(s) was/were recognized. The ASR 307 may succeed at speech recognition where the TAP's ASR 227 failed because the RAP's ASR 307 is preferably more powerful, and includes a larger database of reference words.

In addition to being able to recognize isolated words, the RAP's ASR 307 may also have the capability of recognizing continuous speech. This capability may be useful in a number of instances, including a situation in which a user of the terminal is supposed to say single word commands, but instead says a phrase. For example, it might be expected that the user will say something like "CALL [PAUSE] JOHN [PAUSE]", but instead says "CALL JOHN", without any pauses between the two words. In this case, the phrase "CALL JOHN" could be mistaken as an isolated word by the Start/Stop detector and recording unit 225, and recorded as such. If the TAP's ASR 227 cannot recognize this audio input, the TAP 201 can convert it into MIME-formatted audio encoded data and send it to the RAP 205 along with an indication that the TAP 201 was in a state in which it was expecting a command input. The RAP 205 in this case can respond by applying the unrecognized "isolated word" (in this example, the phrase "CALL JOHN") to its more powerful ASR 307. The RAP's ASR 307 need not be capable of recognizing all possible words that can be spoken by the user. Instead, it may be provided with a list of recognizable TP commands, and perform a so-called "wildcard" recognition operation, in which only the TP command words are looked for. Thus, if the ASR 307 looks for, among other things, the phrase "*CALL*" (where the "*" indicates a "don't care" word that may precede or follow the word "CALL"), then the ASR 307 will detect that the unrecognized "isolated word" consists of the word "CALL" with another unrecognized part following it. This information can then be sent back to the TAP 203. In response, the TAP 203 can invoke the terminal's CALL command, and ask the user to repeat the name of the person who is to be called. Thus, in this aspect of the invention, the ASR function is actually distributed between portions performed in the terminal and portions that are performed remotely, at the RAP 205.

Figure 5:
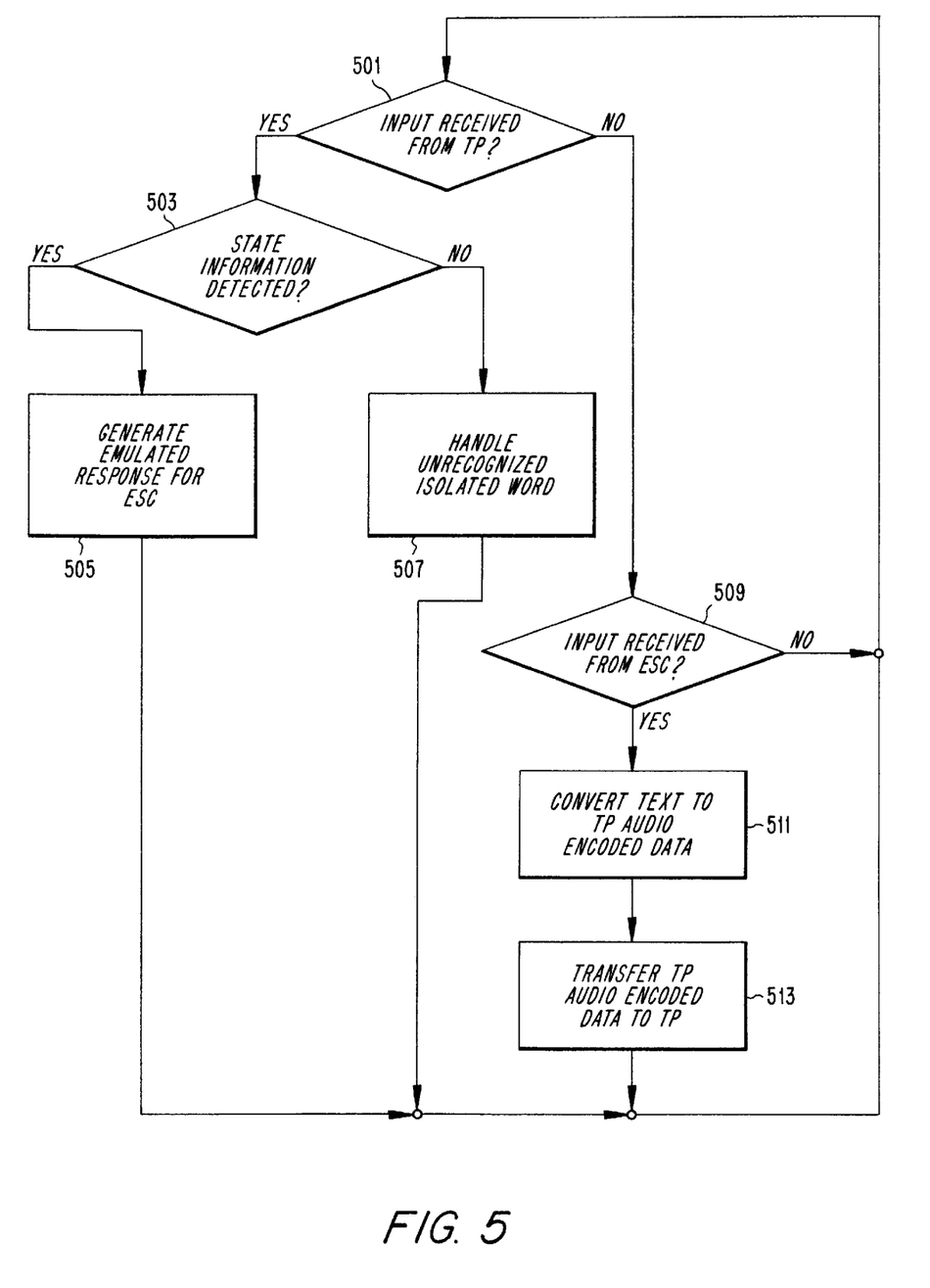
FIG. 5 is a flowchart depicting an exemplary embodiment of the overall operation of the RAP in accordance with an exemplary embodiment of the invention.

FIG. 5 is a flowchart depicting an exemplary embodiment of the overall operation of the RAP 205. If input is received from the TP 203 ("Yes" path out of decision block 501), it is examined to determine what it represents (decision block 503). If it is state information associated with a TP response, then the RAP 205 uses it to update its own state (e.g., the state of the RAP service logic 321) and act accordingly. This may include generating a keyboard emulation response to be forwarded to the ESC 207 (step 505). As mentioned earlier, the keyboard emulation response may include, but is not limited to, text, binary data, state information or a menu selection code.

If the input received from the TP 203 is not state information, then it is a MIME-formatted unrecognized isolated word. This is then handled in accordance with the particular application (step 507). For example, the unrecognized isolated word may be applied to the RAP's ASR 307 which may, for example, generate corresponding text to be forwarded to the ESC 207. The corresponding text, in this case, would be supplied by the RAP reference database 313.

The unrecognized text might alternatively represent audio content that is to be attached to, for example, Email that is forwarded to the WAP application in the ESC 207. In another alternative, the unrecognized text may constitute a control word that may be acted upon by the RAP itself, without requiring communication with the ESC 207. For example, the unrecognized text may be a request for another part of a menu that could not be fully displayed/presented to the user. If the RAP 205 has stored the complete menu, then it can prepare a response for the TP 205 without communicating with the ESC 207.

An alternative to subjecting the received TP audio encoded data to automated speech recognition is to convert it into a different audio format, such as a wave formatted file, which can be attached to, for example, an E-mail response. This conversion is performed by an audio format converter 323. The audio format converter 323 is preferably bidirectional in order to be capable of converting a voice mail format (received from the ESC 207) into TP audio encoded data that may be routed to the TP 203 for the purpose of being played to the user.

If input is not received from the TP ("No" path out of decision block 501), then it must be determined whether text has been received from the ESC 207 (decision block 509). If so ("Yes" path out of decision block 509), then it is preferably supplied to a text-to-TP audio encoder 319 which generates therefrom corresponding TP audio encoded data (step 511). This data may then be formatted into MIME types and transferred to the TP 203 in the WAP protocol (step 513). As explained earlier, the received TP audio encoded data may then be played for the user over the speaker 221. This conversion of text to audio is required when, for example, the application is reading text from the ESC 207 to the user, or when the RAP 205 is reading a stored help text to the user. When the RAP 205 may be a shared resource by clients that use a variety of different encoders, the text-to-TP audio encoder 319 may be designed to support any and all of the necessary audio encoded formats that one of the client terminals may utilize.

In some embodiments, it may be possible to eliminate the audio format converter 323, and to instead look up the text in the RAP reference database 313, and output the corresponding TP audio encoded data. The reason why it is preferred to use a separate audio format converter 323, however, is to be able to generally support services that use a large vocabulary, such as "read my mail" or other services that present text files, such as Help files, to the user. In these instances, it is not desired to store an entire dictionary in the encoded data in the RAP 205.

The RAP 205 further includes a proxy client to next level of services and content unit 325 for supporting access to other external service and content providers.

Looking now at the ESC 207, it may be an application with or without any support for WAP applications, but may in either case be used as an information or content provider to the service application in the RAP 205.

The invention takes advantage of the standardized WML vocabulary and syntax in WAP to enable a WAP-terminal (i.e., a terminal with an implemented WAP client) to have a voice-controlled interface to all services designed for WAP-terminals. The service logic for the VCSA is divided between the TAP 201 and the RAP 205 in the application. All local interactions between the TAP 201 and the TP 203 are handled by TAP WAP service logic 245 in order to minimize transmissions between the TAP 201 and the RAP 205. The TAP WAP service logic 245 issues orders that are carried out by the TAP control logic 235 for controlling the data and information flow within the TAP 201. In another optional aspect of the invention, the TAP control logic 235 may also have the capability of inserting supporting text and words to enhance and improve the dialog with the user compared with the very limited vocabulary in the WML syntax. Such additional text might, for example, be in the form of audio that explains to the user in greater detail what steps must be performed to make a particular menu selection. This additional vocabulary may be stored in the TAP reference database 233 as TP audio encoded data strings. Alternatively, the additional vocabulary may be requested from the RAP reference database 313, and transferred, as TP encoded audio data, over the first data link 211 (WAP channel) to the TP 203, which can play the audio for the user over the speaker 221.

In accordance with another aspect of the invention, it is possible to update, enhance or replace the vocabulary in the TAP reference database 233 with a complete set of text, encoded TP audio data and feature vectors supplied through the RAP 205. The newly downloaded information may represent changes in the WML, or even a new language.

The TAP WAP service logic 245 may be a client to RAP service logic 321 located in the RAP 205. The TAP WAP service logic 245 only controls the TP and TAP functions, and executes the basic WML syntax. It does not support the application-dependent part of the VCSA. The TAP WAP service logic 245 and RAP service logic 321 are synchronized during a service application. The RAP service logic 321 and the vocabulary for supporting a new VCSA may be downloaded to the RAP 205 from an external service provider.

In an exemplary embodiment, in order to activate the VCSA, the user may speak a predefined voice command, such as the word "services". In response, the TP 203 may, for example, convert this speech into TP audio encoded data, and supplies it to the TAP 201 for recognition. Assuming that the user's command is recognized by the TAP ASR 227, TP encoded audio that is provided by the TAP reference database 233 is converted into an audio signal by the TP audio decoder 219 and supplied to the speaker 221. The TAP WAP service logic 245 is responsible for assembling the words into a text string, and the TP control logic 235 executes the appropriate audio output instructions. This audio may prompt the user to make a selection between several alternatives from the service menu stored in the TAP 201. The WAP connection to the RAP 205 will be set up when a particular WAP service application has been selected. The service logic in the TAP 201 and RAP 205 will then start executing the service.

An exemplary service will shortly be described for the purpose of illustration. In order to facilitate a better understanding of the WML portion of the example, a quick reference guide to WML 1.0 will first be presented. In this brief summary, only the WML syntax is illustrated. Values, ranges and defaults of attributes are not shown. This information is well-known, however, and need not be presented here.

The following prolog must appear at the top of every WML deck (i.e., a .wml file):
<?xml version='1.0"?>
<!DOCTYPE WML PUBLIC "-//WAPFORUM//DTD WML 1.0//EN""http://www.wapforum.org/DTD/wml.xml">
<!- This is a comment.→
Every deck has exactly one <WML> element:
<WML xml:language="">
   <HEAD> . . . </HEAD>
   <TEMPLATE> . . . </TEMPLATE>
   <CARD> . . . </CARD >
</WML>
Each deck may optionally have exactly one <HEAD> element:
<HEAD>
   <ACCESS DOMAIN=""PATH=""PUBLIC=""/>
   <META NAME=""HTTP-EQUIV=""USER-AGENT=""CONTENT=""SCHEME=""/>
</HEAD>
Each deck may optionally have exactly one <TEMPLATE> element:
<TEMPLATE ONENTERFORWARD=""ONENTERBACKWARD=""
   <ONTIMER="">
   <DO> . . . </DO>
   <ONEVENT> . . . </ONEVENT>
</TEMPLATE>
Each deck has at least one <CARD >element:
<CARD NAME=""TITLE=""NEWCONTEXT=""STYLE=""ONENTERFORWARD=""ONENTERBACKWARD=""ONTIMER="">
   <DO> . . . </DO>
   <ONEVENT> . . . </ONEVENT>
   <TIMER . . . / >
   <INPUT . . . />
   <SELECT> . . . </SELECT>
   <FIELDSET> . . . </FIELDSET>
   Cards can contain text flow with markup (such as <B > bold </B>) including images <IMG > and anchors <A>.
</CARD>
Navigations are indicated by the <DO> element:
<DO TYPE=""LABEL=""NAME=""OPTIONAL="">
   <GO> . . . </GO>
   <PREV> . . . </PREV>
   <REFRESH>. . . </REFRESH>
   <NOOP . . . />
</DO>

Events are handled by the <ONEVENT> or the <TIMER> element:
```
<ONEVENT TYPE="">
    <GO> . . . </GO>
    <PREV > . . . </PREV>
    <REFRESH> . . . </REFRESH>
    <NOOP . . . / >
</ONEVENT>
<TIMER KEY=""DEFAULT=""/>
```
Specific actions are one of <GO>, <PREV>, <REFRESH>, or <NOOP> elements:
```
<GO URL=""SENDREFERER=""METHOD=""ACCEPT-
    CHARSET=""POSTDATA="">
    <VAR NAME=""VALUE=""/>
</GO>
<PREV>
    <VAR NAME=""VALUE=""/>
</PREV>
<REFRESH >
    <VAR NAME=""VALUE=""/>
</REFRESH>
<NOOP/>
```
Hints how to group input fields can be provided with the <FIELDSET> element:
```
<FIELDSET TITLE="">
    <INPUT . . . />
    <SELECT> . . . </SELECT>
    <FIELDSET> . . . </FIELDSET>
</FIELDSET>
```
Input is obtained by one of <INPUT> or <SELECT> elements:
```
<INPUT KEY=""TYPE=""VALUE=""DEFAULT=
    ""FORMAT=""EMPTYOK=""SIZE=
    ""MAXLENGTH=""TABINDEX=""TITLE=""/>
<SELECT TITLE=""KEY=""DEFAULT=""IKEY=
    ""IDEFAULT=""MULTIPLE=""TABINDEX+"">
    <OPTGROUP> . . . </OPTGROUP>
    <OPTION> . . . </OPTION>
</SELECT>
```
Selection list elements can be grouped using an <OPTGROUP> element:
```
<OPTGROUP TITLE="">
    <OPTION> . . . </OPTION>
    <OPTGROUP> . . . </OPTGROUP>
</OPTGROUP>
```
Selection list elements are specified using an <OPTION> element:
```
<OPTION VALUE=""TITLE=""ONCLICK="">
```
Options have text flow with markup, but no images or anchors.
```
    <ONEVENT> . . . </ONEVENT>
</OPTION>
```
Text flow with markup includes the following elements:
<B> . . . </B>bold
<I> . . . </I> italic
<U> . . . </U> underlined
<BIG> . . . </BIG> increased font size
<SMALL>... </SMALL> decreased font size
<EM> . . . </EM> emphasized
<STRONG> . . . </STRONG> strongly emphasized
<BR ALIGN=""MODE=""/> force line breaks
<TAB ALIGN=""/> align subsequent text in columns
<A TITLE=""> an anchor tag embedded in text flow.
```
    <GO> . . . </GO>
    <PREV> . . . </PREV>
    <REFRESH> . . . </REFRESH>
```
Anchors have text flow with markup, but no images or anchors.
</A>
Images are indicated with the <IMG> element:
```
<IMG ALT=""SRC=""LOCALSRC=""VSPACE=
    ""HSPACE=""ALIGN=""HEIGHT=""WIDTH=""/>
```
The exemplary WAP service will now be described. Suppose a weather information service is available for a WAP-enabled terminal having display/keypad interaction. The service might first present the user with a list of options that, on the screen, look like:

Show weather for:
>Stockholm
  Helsinki
  Zurich
  Other

By pressing the UP or DOWN key, the user can move the cursor (i.e., the ">" character) up or down the list. By pressing an ACCEPT key (on some mobile telephones, such as those manufactured and sold by Ericsson, this is the YES key), the user causes a short code for the selected city to be sent to the weather service provider.

If "Other" is selected, then an input field is provided to the user:

Enter city name:
—

The user then activates appropriate device keys to enter the city name, followed by an ENTER key.

The WML for this service looks like the following:
```
<WML>
    <TEMPLATE>
        <!-- This will be executed for each card in this deck-->
        <DO TYPE="ACCEPT">
            <GO URL="http://weather.com/by-city?$(city)"/ >
        </DO>
    </TEMPLATE>
    <CARD NAME="cities">
    Show weather for:
    <SELECT TITLE="city" IKEY="N" IDEFAULT="1"
        KEY="city">
        <OPTION VALUE="STHM">Stockholm </OPTION>
        <OPTION VALUE="HSKI">Helsinki </OPTION>
        <OPTION VALUE="ZURH">Zurich </OPTION>
        <OPTION ONCLICK="#other"> Other</OPTION>
    </SELECT>
    </CARD>
    <CARD NAME="other">
    Enter city name:
    <INPUT VALUE="city" TYPE="TEXT"/>
    <ICARD>
</WML>
```
Using the above-described inventive techniques in a speech recognition enabled terminal, the user would hear:

"Show weather for these city options"

Note that it combined "Show weather for", the TITLE attribute of the SELECT tag, "city", and some glue text from the TAP reference database 233, "these" and "options". This can be device implementation dependent or predefined as supplementary words to the WML vocabulary in relation to the syntax.

The user then hears the device state the names in the list with a short pause between each.

"Stockholm" [PAUSE]

"Helsinki" [PAUSE]

The purpose of the pause is to give enough time for the user to respond with something, such as:

"ACCEPT", meaning select this one, or

"NO", meaning next, or

"BACKOUT", meaning go back to the previous screen full etc.

If the user responds with "ACCEPT" to the "Other" option, then the device says:

"Enter city name, end with O.K., or pause for 2 seconds."

Note how the device combined the given text, and the instructions to end the input.

The user then speaks the city name, ending with "O.K." Now the device sends the spoken input to the remote application for speech recognition and further processing.

The various aspects of the invention enable a terminal device, with relatively low processing capability and I/O devices that may be cumbersome (e.g., very small) or relatively unavailable (e.g., while driving), to use an interactive voice interface to access service applications that are developed for general use by terminals that do not have these limitations. Complexity of the ASR requirements in the terminal is reduced by separating the speech recognition system for the VCSA into a small terminal speech recognizer for the standard markup language (e.g., WML) syntax and a more powerful speech recognizer for the application dependent part of the VCSA in a remote device having more processing power. As a consequence of this arrangement, no modifications of the service content are necessary.

Another advantage of the invention derives from the fact that it is unnecessary to establish a voice channel between the terminal and the remote application server. This is because the audio response to the application is encoded into predefined digital types, such as MIME types, which are transmitted over a digital data channel.

An additional benefit of the invention is that it provides a general way to standardize and limit the voice dialog vocabulary for any voice controlled service by using a standardized markup language like WML. This simplifies the task of voice recognition, and reduces the errors that would otherwise occur from the presence of different pronunciations of words in a multi-user application.

The invention can also provide a way to determine the end of the user's spoken response to a prompted question or selection, defined by the application, by the insertion of an instruction in the question or optional selection. The instruction tells the user how to end the answer by, for example, saying a special predefined word or by allowing a predefined period of silence to occur that is recognizable by the terminal device. When the user says the predefined word or pauses for the predefined period of time, this is recognized by the ASR 227 in the terminal, enabling the terminal to recognize that what came before was the requested response.

The invention enables the implementation of interactive voice controlled services in different embodiments. Examples of these include, but are not limited to, the following:

Voice browser on a WAP-enabled phone;

Voice-enabled control unit that is digitally connected to the control function in a processing unit;

Voice-enabled special devices, such as electronic notepads;

Voice-enabled control of computer applications, such as Application Program Interfaces (APIs) in windows-based operating systems and client/server environments; and Voice-enabled control of standardized application protocols based on a variety of markup or script languages with a small and defined vocabulary in the interactive application protocol.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a service application provided to a terminal from a remote server, the method comprising the steps of:

receiving an audio input signal representing audio information;

using a first automatic speech recognition system located in the terminal to determine whether the audio input signal includes one or more words defined by a first vocabulary, wherein portions of the audio input signal not corresponding to the one or more words defined by the first vocabulary constitute an unrecognized portion of the audio input signal;

if the audio input signal includes one or more words defined by the first vocabulary, then using a terminal application part of an application protocol service logic to determine what to do with the one or more words defined by the first vocabulary;

formatting the unrecognized portion of the audio input signal for inclusion in a data unit whose structure is defined by a first predefined markup language;

communicating the data unit to a remote application part via a first digital data link that operates in accordance with a first application protocol; and in the remote application part, extracting the formatted unrecognized portion of the audio input signal from the data unit and using a remote application part service logic to determine what to do with the formatted unrecognized portion of the audio input signal.

2. The method of claim 1, wherein the audio input signal is in the form of compressed digitally encoded speech.

3. The method of claim 1, wherein if the audio input signal includes one or more words defined by the first vocabulary, then the terminal application part of the application protocol service logic causes the one or more words to be used to select one or more terminal functions to be performed.

4. The method of claim 3, wherein the one or more terminal functions include selecting a current menu item as a response to be supplied to the remote server.

5. The method of claim 3, wherein:

a current menu item is associated with a first selection; and the one or more terminal functions include associating the current menu item with a second selection that is not the same as the first selection.

6. The method of claim 1, wherein if the audio input signal includes one or more words defined by the first vocabulary, then the terminal application part of the application protocol service logic causes a corresponding message to be generated and communicated to the remote application part via the first digital data link.

7. The method of claim 6, wherein the corresponding message includes state information.

8. The method of claim 6, wherein the corresponding message includes text.

9. The method of claim 6, wherein the corresponding message includes binary data.

10. The method of claim 6, wherein the remote application part forwards the corresponding message to the remote server.

11. The method of claim 10, wherein the remote application part forwards the corresponding message to the remote server via a second digital data link that operates in accordance with a second application protocol.

12. The method of claim 11, wherein the first application protocol is the same as the second application protocol.

13. The method of claim 1, further comprising the steps of:

using a second automatic speech recognition system located in the remote application part to determine whether the unrecognized portion of the audio input signal includes one or more words defined by a second vocabulary; and if the unrecognized portion of the audio input signal includes one or more words defined by the second vocabulary, then using the remote application part service logic to determine what to do with the one or more words defined by the second vocabulary.

14. The method of claim 13, wherein:

the first vocabulary exclusively includes words defined by a syntax of the first predefined markup language; and the second vocabulary exclusively includes words associated with the remote server.

15. The method of claim 13, wherein if the unrecognized portion of the audio input signal includes one or more words defined by the second vocabulary, then the remote application part service logic causes a corresponding keyboard emulation response to be generated and sent to the remote server.

16. The method of claim 13, wherein if the unrecognized portion of the audio input signal includes one or more words defined by the second vocabulary, then the remote application part service logic causes a remote application part service logic state to be changed.

17. The method of claim 1, further comprising the steps of:

in the remote application part, receiving text from the remote server;

in the remote application part, generating a corresponding audio output signal representing audio information;

formatting the audio output signal for inclusion in a second data unit whose structure is defined by the first predefined markup language;

communicating the second data unit to the terminal via the first digital data link; and in the terminal, extracting the audio output signal from the second data unit and generating therefrom a loudspeaker signal.

18. An apparatus for controlling a service application provided to a terminal from a remote server, the apparatus comprising:

means for receiving an audio input signal representing audio information;

a first automatic speech recognition system located in the terminal for determining whether the audio input signal includes one or more words defined by a first vocabulary, wherein portions of the audio input signal not corresponding to the one or more words defined by the first vocabulary constitute an unrecognized portion of the audio input signal;

a terminal application part of an application protocol service logic for determining what to do with the one or more words defined by the first vocabulary if the audio input signal includes one or more words defined by the first vocabulary;

means for formatting the unrecognized portion of the audio input signal for inclusion in a data unit whose structure is defined by a first predefined markup language;

means for communicating the data unit to a remote application part via a first digital data link that operates in accordance with a first application protocol; and the remote application part, comprising:

means for extracting the formatted unrecognized portion of the audio input signal from the data unit; and a remote application part service logic for determining what to do with the formatted unrecognized portion of the audio input signal.

19. The apparatus of claim 18, wherein the audio input signal is in the form of compressed digitally encoded speech.

20. The apparatus of claim 18, wherein the terminal application part of the application protocol service logic comprises:

means for causing the one or more words to be used to select one or more terminal functions to be performed if the audio input signal includes one or more words defined by the first vocabulary.

21. The apparatus of claim 20, wherein the one or more terminal functions include selecting a current menu item as a response to be supplied to the remote server.

22. The apparatus of claim 20, wherein:

a current menu item is associated with a first selection; and the one or more terminal functions include associating the current menu item with a second selection that is not the same as the first selection.

23. The apparatus of claim 18, wherein the terminal application part of the application protocol service logic comprises:

means for causing a corresponding message to be generated and communicated to the remote application part via the first digital data link if the audio input signal includes one or more words defined by the first vocabulary.

24. The apparatus of claim 23, wherein the corresponding message includes state information.

25. The apparatus of claim 23, wherein the corresponding message includes text.

26. The apparatus of claim 23, wherein the corresponding message includes binary data.

27. The apparatus of claim 23, wherein the remote application part includes means for forwarding the corresponding message to the remote server.

28. The apparatus of claim 27, wherein the remote application part includes means for forwarding the corresponding message to the remote server via a second digital data link that operates in accordance with a second application protocol.

29. The apparatus of claim 28, wherein the first application protocol is the same as the second application protocol.

30. The apparatus of claim 18, further comprising:

a second automatic speech recognition system located in the remote application part for determining whether the unrecognized portion of the audio input signal includes one or more words defined by a second vocabulary, and wherein the remote application part service logic includes means for determining what to do with the one or more words defined by the second vocabulary if the unrecognized portion of the audio input signal includes one or more words defined by the second vocabulary.

31. The apparatus of claim 30, wherein:

the first vocabulary exclusively includes words defined by a syntax of the first predefined markup language; and the second vocabulary exclusively includes words associated with the remote server.

32. The apparatus of claim 30, wherein the remote application part service logic comprises:

means for causing a corresponding keyboard emulation response to be generated and sent to the remote server if the unrecognized portion of the audio input signal includes one or more words defined by the second vocabulary.

33. The apparatus of claim 30, wherein the remote application part service logic comprises:

means for causing a remote application part service logic state to be changed if the unrecognized portion of the audio input signal includes one or more words defined by the second vocabulary.

34. The apparatus of claim 18, further comprising:

means, in the remote application part, for receiving text from the remote server;

means, in the remote application part, for generating a corresponding audio output signal representing audio information;

means for formatting the audio output signal for inclusion in a second data unit whose structure is defined by the first predefined markup language;

means for communicating the second data unit to the terminal via the first digital data link; and means, in the terminal, for extracting the audio output signal from the second data unit and generating therefrom a loudspeaker signal.

* * * * *